United States Patent [19]

Scharpf

[11] 3,852,351
[45] Dec. 3, 1974

[54] CHLORINATION OF ACETOACETAMIDES
[75] Inventor: William G. Scharpf, Yardley, Pa.
[73] Assignee: FMC Corporation, New York, N.Y.
[22] Filed: Oct. 2, 1972
[21] Appl. No.: 294,458

[52] U.S. Cl............................ 260/562 B, 260/561 K
[51] Int. Cl........................................... C07c 103/00
[58] Field of Search ......... 260/561 K, 562 K, 562 B

[56] References Cited
UNITED STATES PATENTS
3,449,421    6/1969   Pearson........................... 260/561 K
FOREIGN PATENTS OR APPLICATIONS
60,301     11/1967   Germany........................ 260/561 K

OTHER PUBLICATIONS

Chem. Abstracts, 74:141012Y.

Primary Examiner—Lewis Gotts
Assistant Examiner—Ethel G. Love

[57] ABSTRACT

A process for the production of alpha-chloroacetoacetamides comprising the direct chlorination of acetoacetamides between 0° and 35°C, in a reaction medium consisting of a polar solvent and in the presence of an agent capable of causing enolization of the amide.

5 Claims, No Drawings

CHLORINATION OF ACETOACETAMIDES

This invention relates to a process for the direct chlorination of acetoacetamides to produce the corresponding alpha-chloroacetoacetamides.

U.S. Pat. No. 3,249,499 issued to von Schmeling et al., discloses that certain alpha-chloroacetoacetamides are treated with a potassium salt of mercaptoethanol to yield a desired product having the following structure:

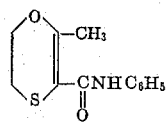

and that this compound is useful for the control of certain plant diseases. Oxidation of this structure adds two oxygen atoms to the sulfur atom to produce the dioxide which is also used to control plant diseases.

Known methods for preparing alpha-chloroacetoacetamides and for preparing alpha-chloroacetoacetic esters utilize sulfuryl chloride which in 1971 cost $14.80 per pound mole. Normally, when chlorine ($2.84 per pound mole) is used as the chlorinating agent for acetoacetanalide, a mixed halogenated product is obtained which surprisingly contains little or no alpha-chloro isomer. It is, therefore, desirable to have a process for the direct chlorination of acetoacetamides, such as acetoacetanilide, with chlorine to produce the corresponding alpha-chloroacetoacetamides.

In accordance with the present invention there is provided a process for the reaction of acetoacetamides with chlorine to produce the corresponding alpha-chloroacetoacetamides, in which acetoacetamides are chlorinated at temperatures between 0° and 35°C in a reaction medium consisting of a polar solvent, such as lower aliphatic alcohols of 1 to 8 carbon atoms, in the presence of a compound which causes enolization of the acetamides such as Lewis acids or chelates. Substantially, anhydrous conditions are necessary. An inert atmosphere, such as nitrogen, can be used to facilitate maintenance of substantially anhydrous reaction conditions. Atmospheric pressure is generally used as hydrogen chloride is evolved. However, subatmospheric pressures can be used provided the overall temperature-pressure conditions do not cause the reaction media to boil and cool the media excessively.

The chlorination reaction is exothermic, and thus the time is dependent upon the efficiency of the heat removal system as well as the stirring employed to maintain an equilibrium temperature in the reaction mixture. The acetoacetamides can be produced in situ in the reaction media by reaction of diketene with an appropriate amine prior to the chlorination reaction.

The chlorination reaction is as follows:

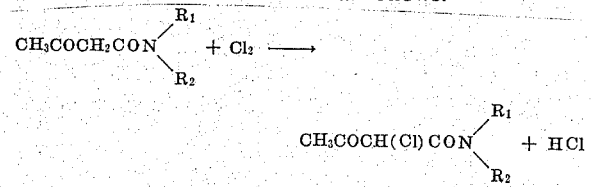

in which $R_1$ can be hydrogen, alkyl or aryl and $R_2$ can be hydrogen, alkyl or aryl. An excess of chlorine can result in the production of dichloroacetoacetamides and an insufficiency of chlorine would yield monochloroacetoacetamide mixed with unreacted acetoacetamide.

Acetoacetamides which can be chlorinated by the process of this invention include but are not limited to acetoacetanilide, acetoacet-meta-xylidide, acetoacet-ortho-anisidide, acetoacet-ortho-toluidide, and N, N-dimethylacetoacetamide.

Alcohols suitable as the reaction medium include lower aliphatic alcohols of 1–8 carbon atoms such as propanol, 2-ethylhexanol, n-butanol, and so forth. Isopropanol was particularly valuable in the chlorination of acetoacetanalide where the $\alpha$ chloroacetoacetanilide was deposited in a form that could be isolated by filtration. The amount of polar solvent was varied between 300 and 1,000 milliliters per mole of starting material. The preferred concentration was 300 milliliters per mole because of ease of isolation of product. The reaction mixture generally starts as a slurry of acetoacetamide which slowly dissolves and gradually forms a slurry of chloroacetoacetamide. The reaction can proceed as a solution or as a slurry.

Use of toluene or an ethanol-heptane mixture as the reaction media for the chlorination of acetoacetanalide resulted in diminished yields of $\alpha$ chloroacetoacetanilide; chlorination of acetoacetanilide in aqueous methanol did not produce alpha-chloroacetoacetanilide.

The reaction is conducted in the presence of a compound which causes enolization of the acetoacetamide. The use of either a Lewis acid or a chelate enolizes the acetoacetamide. Useful Lewis acids include but are not limited to ferric chloride, sulfuric acid, boron trifluoride etherate, titanium tetrachloride, zinc chloride, tin chloride ($SnCl_4$) and agents that form chelates such as copper sulfate and ferrous sulfate and even iron filings which form the iron halide in situ cause the desired chlorination to occur. Concentrations of 0.4 to 0.8 percent of Lewis acids or agents that form chelates, based on acetoacetamide, are generally used; lesser amounts of these materials can be used as can higher amounts; of course, higher amounts can be economically disadvantgeous.

The process of the invention is typically run at temperatures between about 0° and about 35°C and preferably 15° to 25°C. Temperatures below 0°C can be used; temperatures above 35°C but below both the decomposition temperature of the acetoacetamide and boiling point of the solvent can be used. Atmospheric pressure and a substantially anhydrous atmosphere such as is provided by nitrogen, are useful reaction conditions. Substantially anhydrous reaction conditions are generally believed to be satisfactory as small amounts of water interfere with the chlorination. The chlorine is typically added during about a 1 hour period and the reaction allowed to proceed for an additional 2 hours. The reaction is exothermic and since it is undesirable to have the reaction temperature much above 35°C the time is dependent upon the efficiency of the heat removal system employed in the reaction equipment. Thus, the chlorine addition may vary between about ½ to 3 hours depending on the temperature. Efficient stirring is an important factor particularly at low concentrations of solvent per mole of the reactants and efficient stirring helps to maintain an equilibrium temperature in the reaction mixture.

The mechanism of the reaction is believed to be dependent on the formation of an enol tautomer of a 1,3-bis-carbonyl or a related compound. Thus, it can be assumed that wherever the ratio of enol is increased, alpha-chlorination can be accomplished.

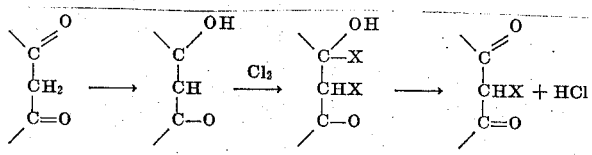

Examples of amides which fit this situation would be:

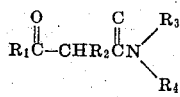

where:
$R_1$ = alkyl, haloalkyl, aryl, aralkyl, or substituted aryl $R_2$ = H or lower alkyl of 1 to 4 carbon atoms $R_3$ and/or $R_4$ = H, alkyl, aryl, aralkyl, or substituted aryl $R_3$ and $R_4$ together form a heterocyclic group.

The following examples further illustrate this invention. In the examples and throughout the specification all proportions are by weight unless stated otherwise, and temperatures in degrees Centigrade.

1. In a 100 ml., 3-neck, round bottom flask fitted with a thermometer, magnetic stirrer, Dry-Ice condenser, and a dropping funnel topped with a second Dry-Ice condenser was placed 8.85 g (0.05 moles) of acetoacetanilide (commercial grade), m.p. 85°, 20 ml. of anhydrous ethanol, and 0.1 g of iron filings. The slurry was stirred and maintained at 5°–9° while 2.3 ml. (0.05 mole) of liquid chlorine was added slowly during 70 minutes. The acetoacetanilide slowly dissolved, then the product slowly precipitated. After an additional 2 hours, the mixture was filtered and the solid was dried in the desiccator to give 6.5 g. (61.4 percent yield) of product, m.p. 128°–133°. A portion was recrystallized from benzene, m.p. 135°–7°, and its infrared spectrum was essentially identical with the spectrum of an authentic sample. A mixed melting point was not depressed. The mother liquor was concentrated to give a second crop of chloroacetoacetanilide, 2.3 g., total yield of 83 percent.

2. The procedure of example I was repeated using 8.85 g. of acetoacetanlide, 30 ml. of denatured, anhydrous ethanol, 0.05 of anhydrous ferric chloride, and 0.05 mole of chlorine to give a total of 8.2 g. of α chloroacetoacetanilide 78 percent yield.

3. The procedure of Example I was repeated using 8.85 g. of acetoacetanilide, 20 ml. of 2-ethylhexanol, 0.05 g. of anhydrous magnesium chloride, and 0.05 mole of chlorine to give 2.3 g. of crude product. This was crystallized from toluene, m.p. 130°–2°, and nmr analysis indicated the solid to be primarily alpha-chloroacetoacetanilide, but mixed with a small amount of unreacted acetoacetanilide.

4. In a 500 ml. 3-neck, round bottom flask fitted with a thermometer, Dry-Ice condenser, magnetic stirrer, and a gas inlet tube was placed 52.8 g. (0.3 mole) of acetoacetanilide, 150 ml. of anhydrous ethanol, and 0.2 g. of sulfuric acid. The slurry was stirred, maintained at 20°–24°, and treated with 15 g. (0.21 mole) of chlorine during 34 minutes. After an additional 2 hours, the mixture was filtered to give 10 g. of product, m.p. 132°–140°, and 17.3 g. as a second crop (yield 43 percent based on acetoacetanilide, 62 percent based on Cl).

5. In a 500 ml., 3-neck, round bottom flask, fitted with a thermometer, mechanical stirrer, Dry-Ice condenser, and inlet tube was placed 52.8 g. (0.3 mole) of acetoacetanilide, 0.2 g. of ferrous sulfate, and 90 ml. of isopropanol. The slurry was stirred and maintained at 0° to 5° during the addition of 21 g. (0.3 mole) of chlorine. The addition took 46 minutes and the mixture was stirred an additional 2 hours, then filtered to give 47.5 g. (76 percent yield) of crude product, m.p. 122°–135°.

6. In an apparatus as described in Example V above was placed 38.7 g. (0.3 mole) of N,N-dimethylacetoacetamide (from Pfaltz and Bauer Co.), 90 ml. of isopropanol, and 0.2 g. of ferrous sulfate. The stirring reaction mixture was maintained at 21–24° during the addition, 45 minutes, of 13.5 ml. (0.3 mole) of liquid chlorine. After stirring for 2 hours longer the mixture was sparged with nitrogen, concentrated in vacuum and then distilled through a 1 ft. Vigreux column to give a forerun of 9.3 g., b.p. 76–80°/0.5 mm., 17.7 g. of product, b.p. 81–83°10.5–0.7 mm., and 3.9 g. of afterrun, b.p. 84–5°/0.7 mm. Nmr spectra confirmed the structure, including alpha substitutions. Analysis: found 21.1 percent chlorine as compared with 21.2 percent theoretical.

What is claimed is:

1. A process for the production of alpha-chloroacetoacetamides comprising the direct chlorination with chlorine of acetoacetamides between 0° and 35°C, in a reaction medium consisting of a polar solvent and in the presence of a Lewis acid capable of causing enolization of the amide.

2. The process of claim 1 in which the acetoacetamide is an acetoacetanilide.

3. The process of claim 1 in which the a Lewis acid causing enolization is present in amounts of 0.4 to 0.8 percent by weight based on the acetoacetamide.

4. The process of claim 1 in which the polar solvent is selected from the group consisting of ethanol, n-propanol, isopropanol, n-butanol, isobutanol, and 2-ethylhexanol.

5. The process of claim 1 in which the Lewis acid is selected from the group consisting of iron chloride, sulfuric acid, copper sulfate, ferrous sulfate, and magnesium chloride.

* * * * *